Dec. 2, 1952 E. Z. CHENETTE ET AL 2,620,041
ENDLESS TREAD STAIR CLIMBING TRUCK
Filed June 24, 1949 2 SHEETS—SHEET 1
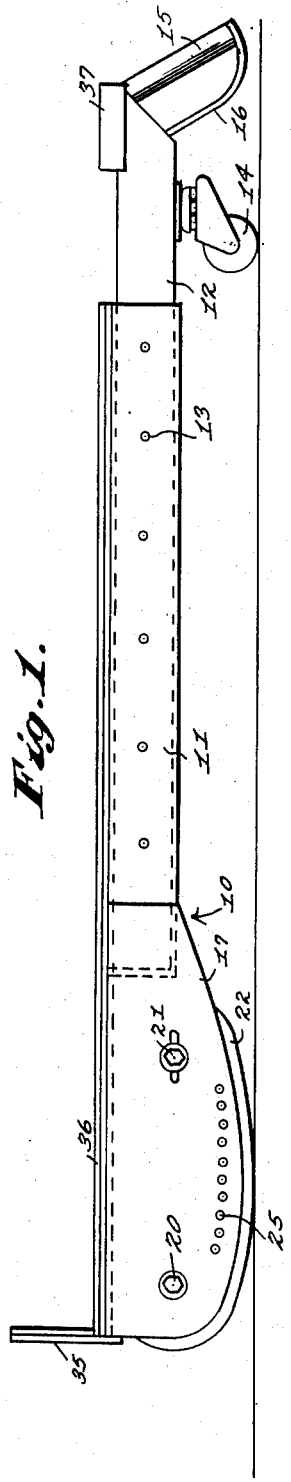
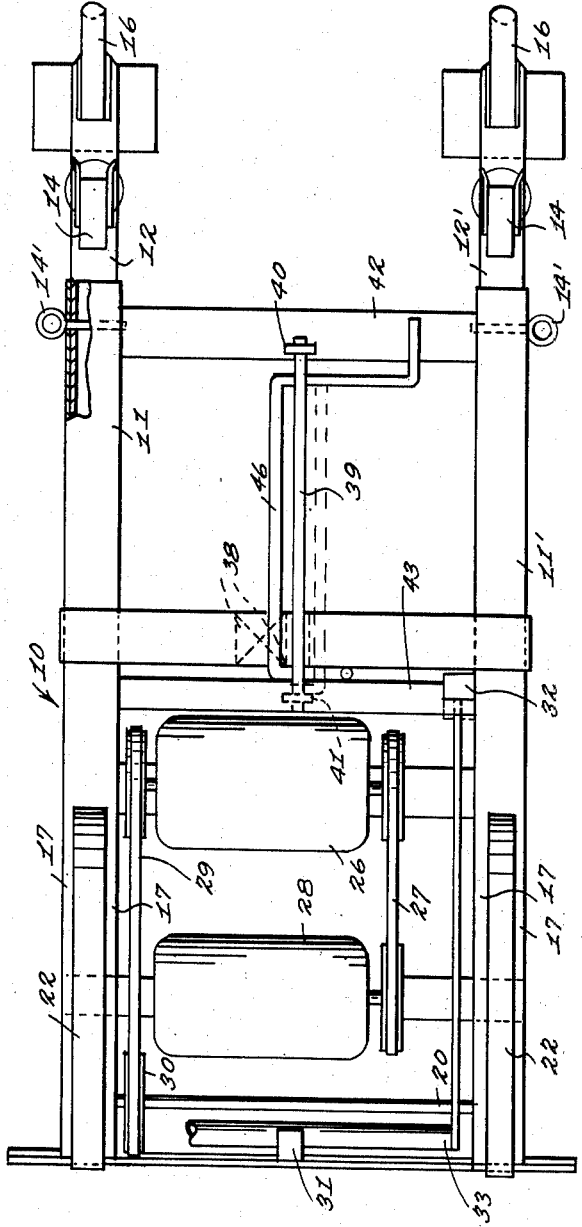
INVENTOR.
JOSEPH C. CHENETTE
BY EDMOND Z. CHENETTE
ATTORNEY Dec. 2, 1952 E. Z. CHENETTE ET AL 2,620,041
ENDLESS TREAD STAIR CLIMBING TRUCK
Filed June 24, 1949 2 SHEETS—SHEET 2
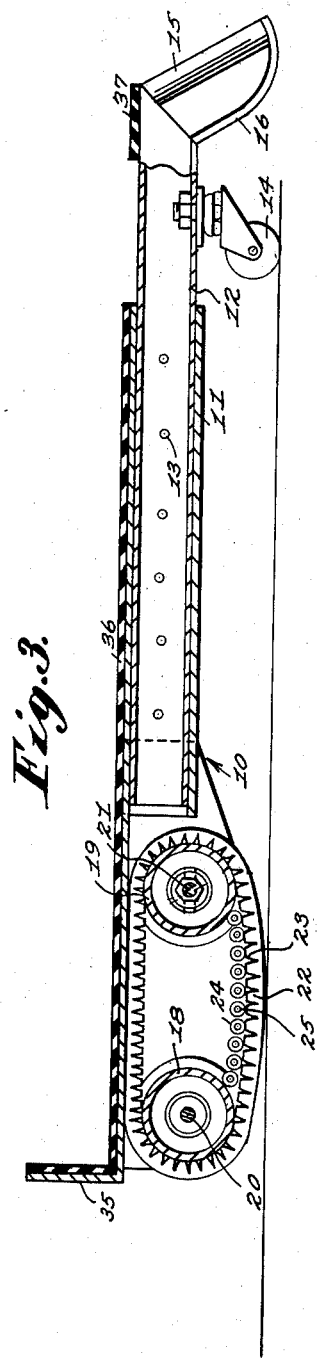
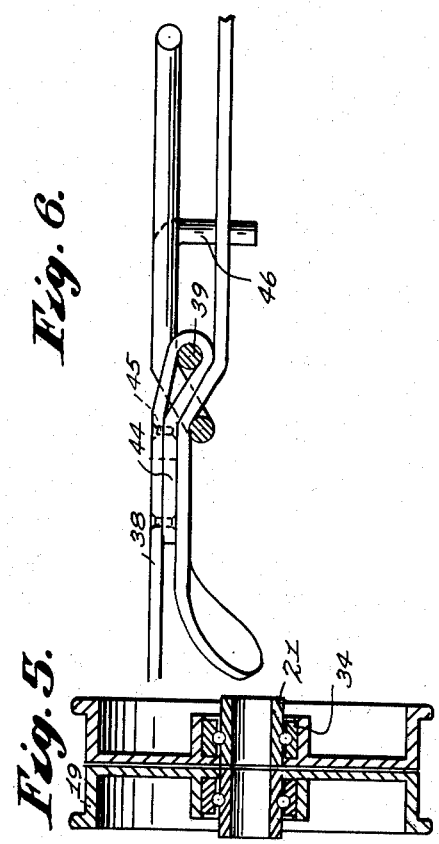
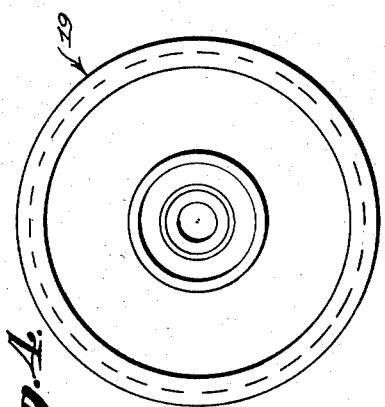
INVENTOR.
JOSEPH C. CHENETTE
BY EDMOND Z. CHENETTE
ATTORNEY Patented Dec. 2, 1952

2,620,041

UNITED STATES PATENT OFFICE 2,620,041

ENDLESS TREAD STAIR CLIMBING TRUCK

Edmond Zenan Chenette and Joseph C. Chenette, Harlingen, Tex.

Application June 24, 1949, Serial No. 101,126

1 Claim. (Cl. 180—9.1)

This invention relates to a truck, and more particularly to a truck for moving hard to handle appliances such as refrigerators, gas ranges, water heaters and the like.

The object of the invention is to provide a truck which will facilitate the movement of hard to handle appliances up the stairs in a home or accomplish other difficult moving problems.

Another object of the invention is to provide a truck which will enable the user to move appliances so that danger of injury, such as rupture, to the user, is minimized.

Still another object of the invention is to provide an appliance moving truck which can be adjusted in order to accommodate appliances of various sizes thereon.

A further object of the invention is to provide a truck for moving appliances which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the appliance moving truck, according to the present invention;

Figure 2 is a bottom plan view of the truck, with parts broken away, and in section;

Figure 3 is a side elevational view of the truck, with parts broken away, and in section;

Figure 4 is an enlarged side elevational view of one of the wheels for supporting the endless belt;

Figure 5 is a sectional view taken through the wheel of Figure 4; and

Figure 6 is a fragmentary enlarged view of the strap tightening mechanism;

Referring in detail to the drawings, there is shown a truck for moving hard to handle appliances, such as refrigerators, gas ranges, water heaters and the like. The truck comprises a frame 10 which has projecting from one end thereof a pair of spaced parallel tubular support members 11 and 11'. An arm 12 is adjustably mounted for movement into and out of the support member 11, and a similar arm 12' is mounted for telescoping movement into and out of the other support member 11'. The arms 12 and 12' are each provided with a plurality of spaced openings which are adapted to register with openings 13 in the support members 11 and 11'. A suitable pin 14' is adapted to be inserted through these registering openings in order to maintain the arms 12 and 12' immobile in their adjusted position.

Each of the arms 12 and 12' is provided with a caster wheel 14, the wheels 14 being mounted for swinging movement about a vertical axis. Further, a handle 15 is secured to the outer or free end of each of the arms 12 and 12'. The handles 15 are adapted to be gripped in the user's hand when the truck is to be raised. A suitable guard 16 is arranged adjacent each of the handles 15 for preventing injury to the user's hands.

Arranged in pairs and secured to the frame 10 are side members 17 and each pair of side members 17 has arranged therebetween a pair of wheels 18 and 19. The pair of front wheels are mounted on a horizontally disposed shaft 20, and the wheels 19 are each rotatably supported by a short shaft or bolt 21. Trained over each pair of wheels 18 and 19 is an endless flexible tread 22, each of which is provided with a plurality of notches or slits 23 therein for increasing the flexibility of the belt. Disposed between the wheels 18 and 19 in a slightly downward curved relation conforming to the like curvature of the lower runs of the treads, is a plurality of rollers 24 which are each supported on shaft 25 that extends between the side members 17, the rollers 24 serving to maintain the aforesaid curvature of the lower runs of the treads under any and all conditions of truck operation.

The truck of the present invention is provided with a power means for causing movement of the truck. The power means includes a motor 28 which may be electrically operated or may be a gasoline operated motor. The motor 28 rotates a belt 27 which is connected to a speed reducer 26. The motor 28 also drives, through the speed reducer 26, an endless belt 29 which is trained over a pulley 30, the pulley 30 being mounted on the shaft 20. Thus, the actuation of the motor 28 causes the wheels 18 to be rotated to thereby cause the truck to move along the floor or ground, since the treads 22 are trained over the wheels 18 and 19.

The truck is also provided with a pair of brackets 31 and 32 which are adapted to support a lifting tool 33 that is useful when the front end of the truck is to be raised or lifted.

The wheels 19 each have a ball bearing race 34 arranged therein in order to provide a smooth operation of the wheels, Figure 5.

The frame has projecting upwardly from its front end a nose plate 35 and secured to the nose plate 35 and to the upper surface of the frame is a resilient padding which may be made of suitable material, such as rubber, the padding being indicated by the numeral 36. A suitable resilient pad 37 is also secured to the outer end of the arms 12 and 12', and the pads 36 and 37 serve to prevent the appliances being carried on the truck from being scratched or otherwise damaged by the truck.

A strap 38 is provided for engagement with the appliance being transported, and the strap 38 serves to prevent the appliance from accidentally falling off of the truck. A means is provided for adjusting the tension of the strap 38 as desired. This means includes a horizontally disposed rotatable rod 39 which is supported by a pair of bearing brackets 40 and 41. The bracket 40 is secured to a brace 42 that extends between the support member 11 and 11' while the bracket 41 is secured to a brace 43 which is arranged in spaced parallel relation with respect to the brace 42. One end of the strap 38 is folded over the rod 39 and suitable rivets 45 and stitching serve to maintain this end of the strap secured to the rod 39. A lever 46 is secured, as by welding, to the rod 39, for rotating the latter, and by properly moving the lever 46 and positioning its end in engagement with the brace 43, the strap 38 can be maintained under tension after it has been wrapped around the appliance being moved, such as refrigerator.

From the foregoing, it is apparent that a truck has been provided which is especially suitable for moving hard to handle appliances, such as refrigerators, gas ranges and the like. The device can be used as a dolly and when the device is used as a dolly, the appliance is supported on the truck and the caster wheels 14 and the treads 22 engage the floor. The dolly is propelled along by means of the motor 28. The rubber padding 36 and 37 prevents damage to the appliance being conveyed. Further, the user can grip the handles 15 in his hands and raise the rear end of the device so as to permit the use thereof as a truck. The truck is so constructed that there will be no difficulty in moving appliances up stairways or accomplishing other difficult moving operations and further the truck will readily make or be capable of being turned around. Although the treads 22 have been shown provided with V-shaped slots it is to be understood that these slots may have other shapes such as rectangular.

What I claim:

In a hand truck, an elongated frame including a pair of spaced parallel side members and spaced transversely disposed brace elements interconnecting the side members, adjustable extensions projecting from the rear ends of the side members, a hand grip at the free end of each of the extensions, a caster mounted on the lower sides of the free end portions of the extensions, a pair of elongated side plates secured on the opposite sides of the forward end portion of each of the side members, a stub shaft mounted transversely in the rear end portions of each pair of the side plates, a pair of wheels mounted in side-to-side relation on each of the stub shafts between the respective of the side plates, a shaft mounted transversely through the rear end portions of both pair of the side plates, a pair of wheels mounted in side-to-side relation on each end portion of the shaft between the respective of the side plates, the outer sides of the wheels of each pair being flanged, an endless tread trained about the pairs of wheels at each side of the frame, the lower edges of the side plates being arcuate in form, a series of closely spaced rollers journalled transversely of the pairs of side plates along the said arcuate edges whereby the lower runs of the treads will be supported with a sagging curvature, and a power means mounted between the pairs of side plates and operatively connected with the shaft to drive the wheels and treads.

EDMOND ZENAN CHENETTE.
JOSEPH C. CHENETTE.

REFERENCES CITED

The following references are of record in the file of this patent:

UNITED STATES PATENTS

| Number | Name | Date |
| --- | --- | --- |
| 728,957 | Moore | May 26, 1903 |
| 1,942,022 | Faries | Jan. 2, 1934 |
| 2,214,311 | Stevens | Sept. 10, 1940 |
| 2,277,302 | Chenette | Mar. 24, 1942 |
| 2,301,341 | Stevens et al. | Nov. 10, 1942 |
| 2,400,824 | Jackson | May 21, 1946 |